United States Patent
Agrawal

(10) Patent No.: US 11,164,400 B2
(45) Date of Patent: *Nov. 2, 2021

(54) AUTOMATIC DETECTION OF DATA FOR ANNOTATION FOR AUTONOMOUS VEHICLE PERCEPTION

(71) Applicant: GM Cruise Holdings LLC, San Francisco, CA (US)

(72) Inventor: Pranay Agrawal, San Francisco, CA (US)

(73) Assignee: GM CRUISE HOLDINGS LLC, San Francisco, CA (US)

(*) Notice: Subject to any disclaimer, the term of this patent is extended or adjusted under 35 U.S.C. 154(b) by 135 days.

This patent is subject to a terminal disclaimer.

(21) Appl. No.: 16/458,078

(22) Filed: Jun. 30, 2019

(65) Prior Publication Data

US 2020/0409364 A1 Dec. 31, 2020

Related U.S. Application Data

(63) Continuation of application No. 16/458,005, filed on Jun. 29, 2019.

(51) Int. Cl.
*G05D 1/00* (2006.01)
*G05D 1/02* (2020.01)
(Continued)

(52) U.S. Cl.
CPC .......... *G07C 5/008* (2013.01); *G05B 13/027* (2013.01); *G05D 1/0088* (2013.01); *G05D 1/024* (2013.01);
(Continued)

(58) Field of Classification Search
CPC .... G07C 5/008; G05B 13/027; G05D 1/0088; G05D 1/0231; G05D 1/0257; G05D 1/024;
(Continued)

(56) References Cited

U.S. PATENT DOCUMENTS

2018/0314921 A1* 11/2018 Mercep ................... G01S 13/87
2020/0320430 A1* 10/2020 Kunnumma ......... G06K 9/6267

OTHER PUBLICATIONS

"Reply to Non-Final Office Action for U.S. Appl. No. 16/458,005", filed Jun. 17, 2021, 19 Pages.
(Continued)

*Primary Examiner* — Anne Marie Antonucci
(74) *Attorney, Agent, or Firm* — Medley, Behrens & Lewis, LLC

(57) ABSTRACT

Various technologies described herein pertain to detecting sensor data to be annotated for autonomous vehicle perception algorithm training. A label identifying a type of an object is assigned to an object at a particular location in an environment based on sensor data generated by a sensor system of an autonomous vehicle for a given time. The label is assigned based on a confidence score assigned to the type of the object by a computer-implemented perception algorithm. The computer-implemented perception algorithm assigns the confidence score to the type of the object based on the sensor data corresponding to the particular location in the environment for the given time. An output of a heuristic is generated based on the label and/or the confidence score, and the output of the heuristic is used to control whether to cause the sensor data for the given time to be annotated.

20 Claims, 8 Drawing Sheets

(51) Int. Cl.
  *G05B 13/02* (2006.01)
  *G07C 5/00* (2006.01)
  *G06K 9/00* (2006.01)
(52) U.S. Cl.
  CPC ......... *G05D 1/0221* (2013.01); *G05D 1/0231* (2013.01); *G05D 1/0257* (2013.01); *G06K 9/00805* (2013.01); *G05D 2201/0213* (2013.01)
(58) Field of Classification Search
  CPC ......... G05D 1/0221; G05D 2201/0213; G06K 9/00805
  See application file for complete search history.

(56) References Cited

OTHER PUBLICATIONS

"Non-Final Office Action for U.S. Appl. No. 16/458,005", dated Mar. 17, 2021, 31 Pages.

\* cited by examiner

AUTOMATIC DETECTION OF DATA FOR ANNOTATION FOR AUTONOMOUS VEHICLE PERCEPTION

CROSS-REFERENCE TO RELATED APPLICATION

This application is a continuation of U.S. patent application Ser. No. 16/458,005, filed on Jun. 29, 2019, and entitled "AUTOMATIC DETECTION OF DATA FOR ANNOTATION FOR AUTONOMOUS VEHICLE PERCEPTION", the entirety of which is incorporated herein by reference.

BACKGROUND

An autonomous vehicle is a motorized vehicle that can operate without a human driver. An exemplary autonomous vehicle includes a plurality of sensor systems, such as but not limited to, a lidar sensor system, a camera sensor system, and a radar sensor system, amongst others. The autonomous vehicle operates based upon sensor data outputted by the sensor systems. More particularly, a perception system of the autonomous vehicle can detect object(s) within proximity of the autonomous vehicle, and operation of the autonomous vehicle can be controlled based at least in part on the object(s) nearby the autonomous vehicle detected by the perception system.

The perception system can employ a computer-implemented perception algorithm to detect the object(s) in proximity of the autonomous vehicle. The computer-implemented perception algorithm can be trained based on previously collected sensor data annotated by human labelers. However, annotating sensor data can be time consuming and costly. Thus, since autonomous vehicles collect significant amounts of sensor data that can potentially be annotated, human labelers are unable to annotate all of the sensor data.

Various conventional approaches are utilized to select sensor data for annotation. One typical approach is to randomly sample the sensor data collected by an autonomous vehicle for annotation. For instance, as an autonomous vehicle is traveling through an environment collecting sensor data, the sensor data generated periodically at points in time can be utilized for annotation (e.g., sensor data frames captured every 30 minutes can be selected for annotation). Another conventional approach for selecting sensor data for annotation is based on random selection given various requirements. For instance, sensor data captured by an autonomous vehicle can be categorized in different data sets, and the sensor data to be annotated can be chosen from the different data sets. By way of illustration, a first data set can include sensor data obtained for nighttime driving, a second data set can include sensor data obtained for congested city driving, a third data set can include sensor data obtained for driving in situations in which pedestrians are within proximity of the autonomous vehicles collecting the sensor data, a fourth data set can include sensor data obtained for driving in situations in which heavy vehicles are within proximity of the autonomous vehicles collecting the sensor data, or the like. Following this illustration, sensor data can be randomly sampled within each of the data sets to select sensor data to be annotated by human labelers. However, sensor data selected utilizing the conventional approaches may not lead to an improved computer-implemented perception algorithm when annotated and utilized for training the computer-implemented perception algorithm.

SUMMARY

The following is a brief summary of subject matter that is described in greater detail herein. This summary is not intended to be limiting as to the scope of the claims.

Described herein are various technologies that pertain to detecting sensor data to be annotated for autonomous vehicle perception algorithm training. The sensor data to be annotated can be automatically detected from drive logs such that the detected sensor data results in enhanced computer-implemented perception algorithm(s) when such perception algorithm(s) are trained utilizing the detected sensor data annotated by human labelers. Thus, the techniques set forth herein enable detecting sensor data that can be employed to improve a computer-implemented perception algorithm if the sensor data is annotated and used for training the computer-implemented perception algorithm.

According to various embodiments, a label can be assigned to an object at a particular location in an environment based on sensor data generated by a sensor system of an autonomous vehicle for a given time. The label can identify a type of the object. The label can be assigned based on a confidence score assigned to the type of the object from amongst a predefined set of types by a computer-implemented perception algorithm. The computer-implemented perception algorithm can assign the confidence score to the type of the object based on the sensor data corresponding to the particular location in the environment for the given time. Moreover, an output of a heuristic can be generated based on the label and/or the confidence score assigned based on the sensor data for the given time. Further, whether to cause the sensor data for the given time to be annotated can be controlled based on the output of the heuristic.

In accordance with various embodiments, the autonomous vehicle can assign the label to the object, generate the output of the heuristic, and control whether to cause the sensor data for the given time to be annotated based on the output of the heuristic. According to various examples, the autonomous vehicle can control whether to cause the sensor data for the given time to be annotated by selectively storing the sensor data for the given time for annotation based on the output of the heuristic, selectively flagging the sensor data for the given time for annotation based on the output of the heuristic, selectively transmitting the sensor data for the given time to a server computing system for annotation based on the output of the heuristic, a combination thereof, or the like. For instance, sensor data to be annotated can be retained in a data store of the autonomous vehicle and/or transmitted to the server computing system, whereas other sensor data need not be stored and/or transmitted, which can reduce the amount of data stored and/or the bandwidth utilized for such transmission.

According to other embodiments, the server computing system can assign the label to the object, generate the output of the heuristic, and control whether to cause the sensor data for the given time to be annotated based on the output of the heuristic. Further, it is contemplated that the autonomous vehicle can utilize a first computer-implemented perception algorithm to assign a first label to an object at a particular location in the environment and the server computing system can utilize a second computer-implemented perception algorithm to assign a second label to the object at the particular location in the environment. Following this example, the server computing system can generate the output of the heuristic and control whether to cause the sensor data to be annotated based on the output of the heuristic.

Various heuristics are intended to fall within the scope of the hereto appended claims. According to an example, a heuristic can compare labels and/or confidence scores assigned by computer-implemented perception algorithms for different sensor system modalities. Pursuant to another example, a heuristic can compare labels and/or confidence scores assigned by a computer-implemented perception algorithm over time within a threshold time duration. In accordance with yet another example, a heuristic can compare labels and/or confidence scores assigned by different computer-implemented perception algorithms for a common sensor system (e.g., one computer-implemented perception algorithm can be utilized by the autonomous vehicle and a second computer-implemented perception algorithm can be run offline by the server computing system, both computer-implemented perception algorithms can be utilized by the autonomous vehicle, both computer-implemented perception algorithms can be utilized by the server computing system).

The techniques set forth herein employ a heuristic (or a plurality of heuristics) to automatically detect whether sensor data is to be annotated. Use of the heuristic enables sensor data likely to improve performance of a perception algorithm trained on such sensor data that is annotated by a human labeler to be stored in a data store of the autonomous vehicle (e.g., reducing an amount of data to be stored in the data store), transmitted over limited bandwidth between the autonomous vehicle and the server computing system, or the like.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
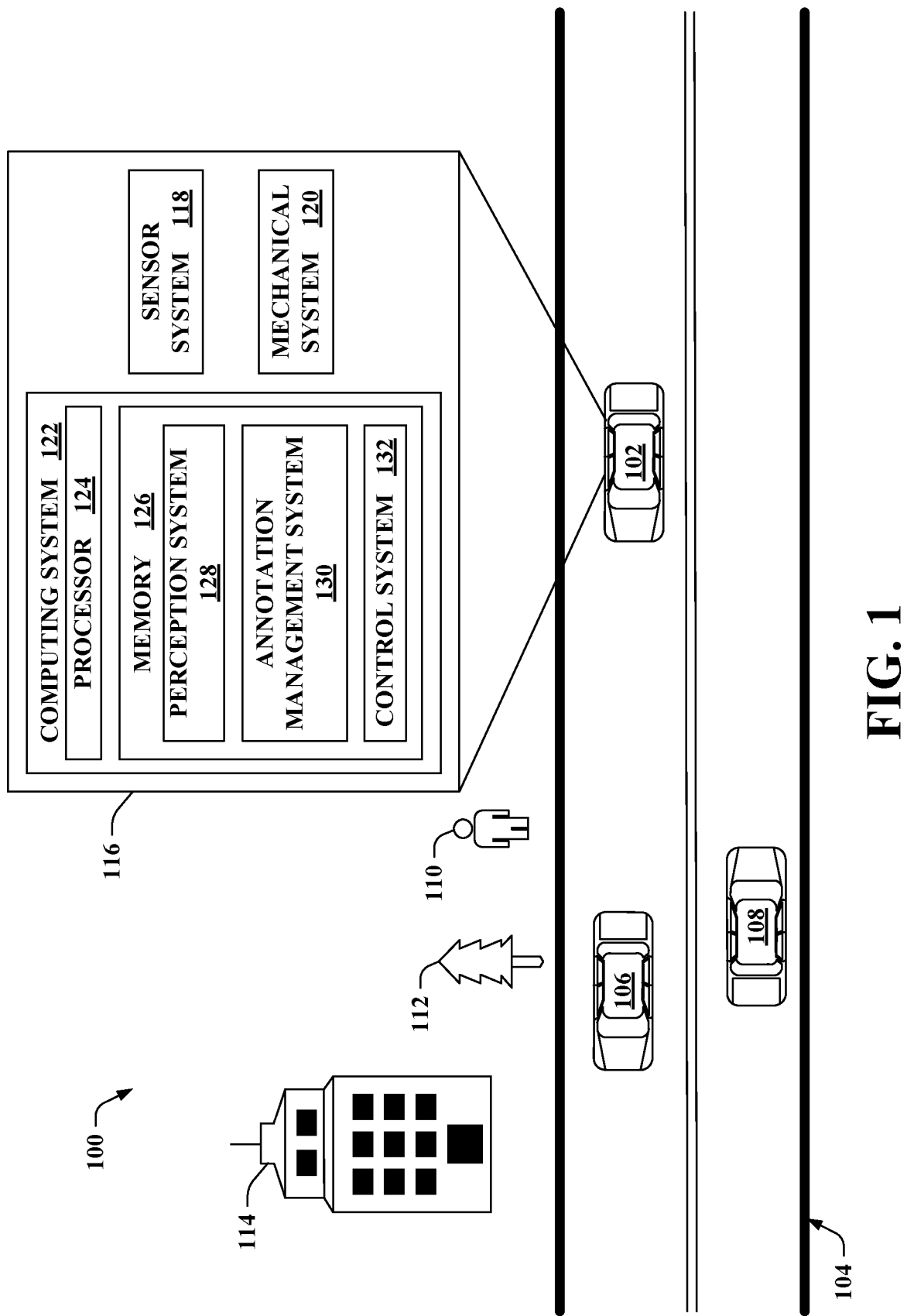
FIG. 1 illustrates an exemplary operating environment of an autonomous vehicle.

Various technologies pertaining to automatically detecting sensor data to be annotated for autonomous vehicle perception algorithm training are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean "serving as an illustration or example of something." Moreover, as used herein, the terms "perception algorithm" and "computer-implemented perception algorithm" are used interchangeably.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Turning now to the drawings, FIG. 1 illustrates an exemplary operating environment 100 of an autonomous vehicle 102. The operating environment 100 includes a roadway 104 on which the autonomous vehicle 102 is driving. Moreover, a vehicle 106 and a vehicle 108 are also driving on the roadway 104 within proximity of the autonomous vehicle 102 in the environment 100. The environment 100 further includes a pedestrian 110, vegetation 112, and a building 114 within proximity of the autonomous vehicle 100. While the environment 100 is depicted as including the vehicle 106, the vehicle 108, the pedestrian 110, the vegetation 112, and the building 114, it is contemplated that this example can be extended to substantially any sort of environment in which the autonomous vehicle 102 can operate.

As the autonomous vehicle 102 travels within the environment 100, the autonomous vehicle 102 can employ one or more computer-implemented perception algorithms to detect objects within the environment 100. At a given time, a perception algorithm can be utilized by the autonomous vehicle 102 to detect a type of an object at a particular location in the environment 100. For instance, a perception algorithm can be utilized by the autonomous vehicle 102 to detect that a first object is at a first location in the environment 100 (where the vehicle 106 is located) and can identify the first object as a car. The perception algorithm can further be utilized by the autonomous vehicle 102 to detect that a second object is at a second location in the environment 100 (where the vehicle 108 is located) and can identify the second object as a car. Moreover, the perception algorithm can be utilized by the autonomous vehicle 102 to detect that a third object is at a third location in the environment 100 (where the pedestrian 110 is located) and can identify the third object as a pedestrian. The perception algorithm can be utilized by the autonomous vehicle 102 to detect that a fourth object is at a fourth location in the environment 100 (where the vegetation 112 is located) and can identify the fourth object as vegetation. Still yet, the perception algorithm can be utilized by the autonomous vehicle 102 to detect that a fifth object is at a fifth location in the environment 100 (where the building 114 is located) and can identify the fifth object as a building.

However, in the various scenarios, one or more of the computer-implemented perception algorithms may perform unsatisfactorily. For instance, a perception algorithm may assign an improper label to an object at a given location in the environment 100 (e.g., the vehicle 106 may be improperly labeled as a bicycle rather than a car). Pursuant to another example, a perception algorithm may change a label assigned to an object at a given location in the environment 100 over time (e.g., the vehicle 108 may be labeled as a car at a first time and may be labeled as a truck at a second time). Moreover, different computer-implemented perception algorithms may assign different labels to an object at a given location in the environment (e.g., a first perception algorithm can label the vegetation 112 as a pedestrian and a second perception algorithm can label the vegetation 112 as vegetation).

Accordingly, it can be desirable to identify sensor data generated by the autonomous vehicle 102 (or other autonomous vehicles) in situations in which a currently employed computer-implemented perception algorithm performs unsatisfactorily. Subsequent to detecting such sensor data, the sensor data can be annotated by human labelers and utilized to train an updated computer-implemented perception algorithm. By way of illustration, assuming that the currently employed computer-implemented perception algorithm performs poorly in the scene depicted in FIG. 1, then the sensor data generated in this situation can potentially be annotated by a human labeler. When annotating the sensor data (e.g., a frame captured by the autonomous vehicle 102), a human labeler can be prompted to identify every vehicle, road, pedestrian, vegetation, building, and so forth in the sensor data. According to an example, the human labeler can draw bounding boxes around representations of the vehicle 106, the vehicle 108, the pedestrian 110, the vegetation 112, the building 114, and the roadway 104 in the sensor data frame and can identify the type of the object in each of the bounding boxes.

Componentry of the autonomous vehicle 102 is shown in callout 116. The autonomous vehicle 102 includes a sensor system 118, a mechanical system 120, and a computing system 122. While the autonomous vehicle 102 is illustrated in FIG. 1 as including a single sensor system 118 and a single mechanical system 120, it is to be understood that the autonomous vehicle 102 can include multiple sensor systems and multiple mechanical systems.

The computing system 122 includes a processor 124 and memory 126 as described in greater detail herein. A perception system 128, an annotation management system 130, and a control system 132 are loaded in the memory 126. The sensor system 118 can generate sensor data representative of the environment 100 in which the autonomous vehicle 102 is located. The perception system 128 can assign a label to an object in a particular location in the environment 100 based on the sensor data generated by the sensor system 118 at a given time. Moreover, the annotation management system 130 can detect and control whether to cause the sensor data for the given time generated by the sensor system 118 to be annotated as described in greater detail herein. Further, the control system 132 can control operation of the mechanical system 120 of the autonomous vehicle 102 to effectuate appropriate motion of the autonomous vehicle 102 (e.g., based on object(s) detected within proximity of the autonomous vehicle 102 in the environment 100).

More particularly, the perception system 128 can assign a label to an object at a particular location in the environment 100 based on the sensor data generated by the sensor system 118 for a given time. The label identifies the type of the object. Moreover, the label is assigned based on a confidence score assigned to the type of the object from amongst a predefined set of types by a computer-implemented perception algorithms. According to an example, the predefined set of types can include a pedestrian, a car, or truck, a bus, static objects such as a building, a road, vegetation, etc., or the like. The computer-implemented perception algorithm can assign the confidence score to the type of the object based on the sensor data corresponding to the particular location in the environment 100 for the given time. Thus, the perception system 128 can utilize the computer-implemented perception algorithm to assign a confidence score and label to the object at the location of the pedestrian 110 in the environment (e.g., the perception system 128 can label such object as a pedestrian).

Moreover, the annotation management system 130 can generate an output of a heuristic based on the label and/or the confidence score assigned based on the sensor data for the given time. Various heuristics are intended to fall within the scope of the hereto appended claims. According to an example, a heuristic can compare labels and/or confidence scores assigned by computer-implemented perception algorithms for different sensor system modalities. Pursuant to another example, a heuristic can compare labels and/or confidence scores assigned by a computer-implemented perception algorithm over time within a threshold time duration. In accordance with yet another example, a heuristic can compare labels and/or confidence scores assigned by different computer-implemented perception algorithms for a common sensor system.

The annotation management system 130 can further control whether to cause the sensor data for the given time to be annotated based on the output of the heuristic. Accordingly, the annotation management system 130 can automatically detect scenes in which the computer-implemented perception algorithm(s) employed by the perception system 128 performs poorly, thereby causing sensor data corresponding to these scenes to be stored, flagged, transmitted, or a combination thereof to enable such sensor data to be annotated (whereas limited resources such as storage, bandwidth between the autonomous vehicle 100 and a server computing system, or the like need not be utilized for other sensor data capturing scenes in which the computer-implemented perception algorithm(s) are not performing poorly).

Figure 2:
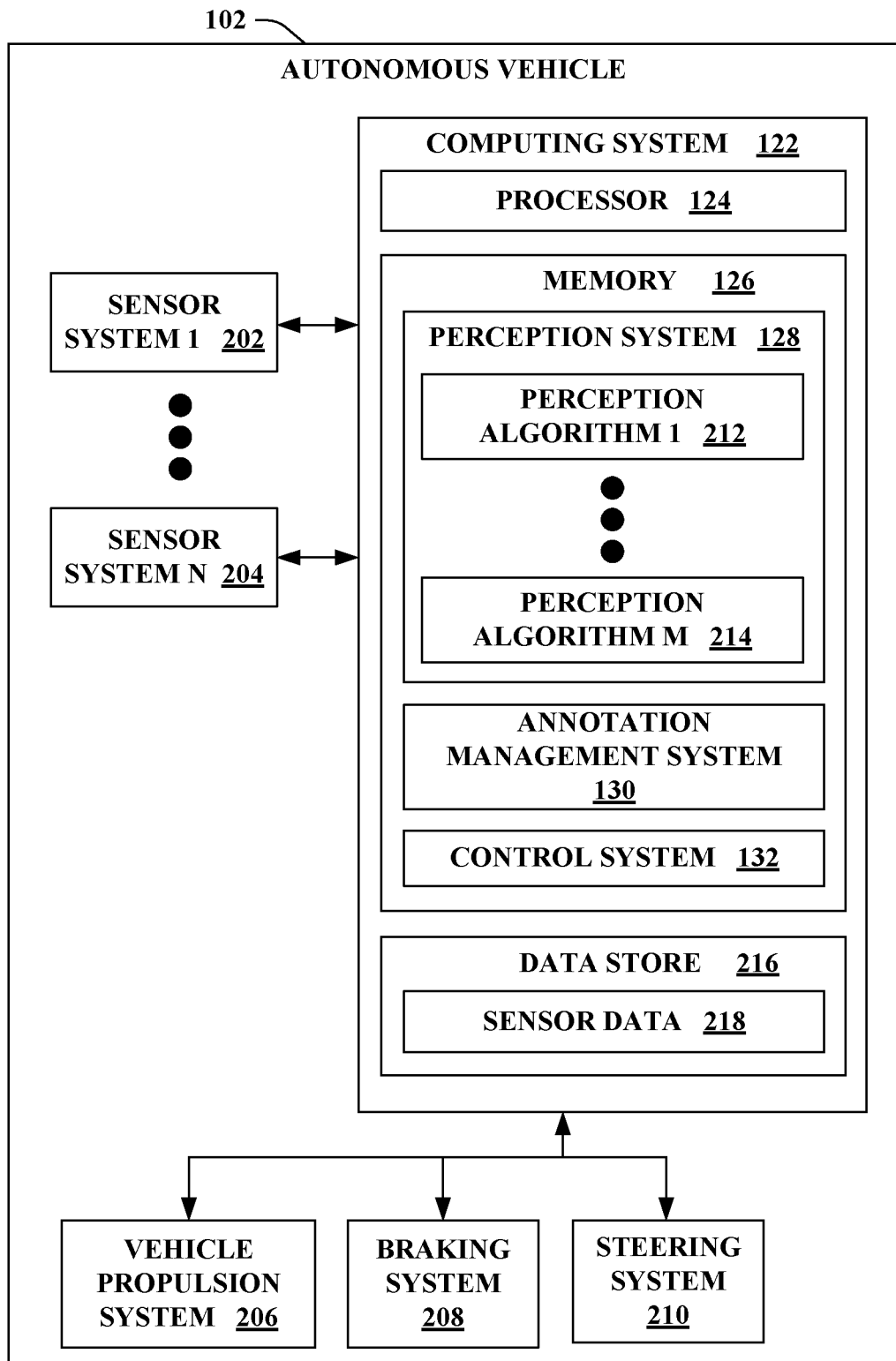
FIG. 2 illustrates a functional block diagram of an exemplary autonomous vehicle that automatically detects sensor data for annotation for autonomous vehicle perception algorithm training.

Turning to FIG. 2, illustrated is a block diagram of the autonomous vehicle 102 according to various embodiments. The autonomous vehicle 102 can navigate about roadways without human conduction based upon sensor data outputted by sensor systems of the autonomous vehicle 102. As shown in FIG. 2, the autonomous vehicle 102 includes a plurality of sensor systems, namely, a sensor system 1 202, . . . , and a sensor system N 204, where N can be substantially any integer greater than one (collectively referred to herein as sensor systems 202-204). The sensor systems 202-204 include the sensor system 118 of FIG. 1. The sensor systems 202-204 are of different types and are arranged about the autonomous vehicle 102. For example, the sensor system 1 202 may be a lidar sensor system and the sensor system N 204 may be a camera (image) sensor system. Other exemplary sensor systems included in the sensor systems 202-204 can include radar sensor systems, GPS sensor systems, sonar sensor systems, infrared sensor systems, and the like.

The autonomous vehicle 102 further includes several mechanical systems (e.g., the mechanical system 120 of FIG. 1) that are used to effectuate appropriate motion of the autonomous vehicle 102. For instance, the mechanical systems can include, but are not limited to, a vehicle propulsion system 206, a braking system 208, and a steering system 210. The vehicle propulsion system 206 may be an electric engine, an internal combustion engine, or a combination thereof. The braking system 208 can include an engine break, brake pads, actuators and/or any other suitable componentry that is configured to assist in decelerating the autonomous vehicle 102. The steering system 210 includes suitable componentry that is configured to control the direction of movement of the autonomous vehicle 102.

As described above, the autonomous vehicle 102 further includes the computing system 122, which includes the processor 124 and the memory 126. The computing system 122 is in communication with the sensor systems 202-204, the vehicle propulsion system 206, the braking system 208, and the steering system 210. The memory 126 of the computing system 122 includes computer-executable instructions are executed by the processor 124. Pursuant to various examples, the processor 124 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

The memory 126 includes the perception system 128 that assigns labels to objects at locations in an environment based on sensor data generated by the sensor systems 202-204. The perception system 128 can include a perception algorithm 1 212, . . . , and a perception algorithm M 214, where M can be substantially any integer greater than one (collectively referred to herein as perception algorithms 212-214). Pursuant to an example, the perception system 128 can include a respective perception algorithm for each of the sensor systems 202-204 (e.g., a one-to-one mapping between sensor systems 202-204 and perception algorithms 212-214, N and M are the same integer value). Following this example, the perception system 128 can utilize the perception algorithm 1 212 to assign labels to objects at locations in an environment based on sensor data generated by the sensor system 1 202, . . . , and the perception system 128 can utilize the perception algorithm M 214 to assign labels to the objects at the particular locations in the environment based on sensor data generated by the sensor system N 204. However, according to other examples, it is contemplated that more than one perception algorithm can be utilized with a particular sensor system and/or one perception algorithm can be utilized with more than one sensor system.

Pursuant to an example, the perception algorithms 212-214 can be neural networks. An image (e.g., sensor data) generated by a camera sensor system (e.g., one of the sensor systems 202-204) can be inputted to a particular neural network (e.g., one of the perception algorithms 212-214); the neural network can assign a label identifying a type of an object in the image at a particular location as well as a confidence score assigned to the type of the object. Moreover, a lidar scan (e.g., sensor data) generated by a lidar sensor system (e.g., another one of the sensor systems 202-204) can be inputted to a different neural network (e.g., a differing one of the perception algorithms 212-214); again, the different neural network can assign a label identifying a type of an object in the lidar scan at the particular location as well as a confidence score assigned to the type of the object. However, it is contemplated that the perception algorithms 212-214 can be substantially any type of deep learning model or machine learning model.

The memory 126 also includes the annotation management system 130 and the control system 132. The annotation management system 130 generates an output of a heuristic based on a label and/or confidence score assigned by the perception system 128 based on the sensor data for a given time. The annotation management system 130 can further control whether to cause the sensor data for the given time to be annotated based on the output of heuristic. Moreover, the control system 132 is configured to control at least one of the mechanical systems of the autonomous vehicle 102. Thus, the control system 132 can control the vehicle propulsion system 206, the braking system 208, and/or the steering system 210 to cause the autonomous vehicle 102 to traverse through an environment based on object(s) detected in an environment by the perception system 128.

The computing system 122 can further include a data store 216 that can retain sensor data 218. According to an example, the annotation management system 130 can control whether particular sensor data for a given time and/or a given sensor system is to be stored in the data store 216 as the sensor data 218. Additionally or alternatively, the annotation management system 130 can flag a subset of the sensor data 218 in the data store 216 based on whether such sensor data 218 is to be annotated.

According to an example, the annotation management system 130 can control whether to cause sensor data for a given time to be annotated based on output of a heuristic by selectively storing the sensor data for the given time for annotation based on the output of the heuristic in the data store 216. Following this example, the annotation management system 130 can selectively store the sensor data 218 based on the output of heuristic (e.g., sensor data to be annotated as determined based on the output of the heuristic is stored as part of the sensor data 218 in the data store 216 while other sensor data is discarded). According to another example, the annotation management system 130 can control whether to cause the sensor data for a given time to be annotated based on the output of the heuristic by selectively flagging the sensor data 218 in the data store 216. Thus, the sensor data for the given time can be selectively flagged for annotation based on the output of the heuristic (e.g., sensor data to be annotated as determined based on the output of the heuristic is flagged in the data store 216). Pursuant to yet another example, the annotation management system 130 can control whether to cause the sensor data for a given time to be annotated based on the output of the heuristic by selectively transmitting the sensor data for the given time to a server computing system based on the output of the heuristic (e.g., sensor data to be annotated as determined based on the output of the heuristic is transmitted from the autonomous vehicle 102 while other sensor data is not transmitted from the autonomous vehicle 102). It is further contemplated that a combination of the foregoing can be employed. Thus, the sensor data 218 can be selectively stored in the data store 216 by the annotation management system 130 and the stored sensor data 218 to be annotated can be transmitted to the server computing system (whereas sensor data that need not be annotated as determined by the annotation management system 130 is not stored in the data store 216 and is not transmitted to the server computing system).

Various heuristics are intended to fall within the scope of the hereto appending claims. One or more of the heuristics are utilized by the annotation management system 130 to select sensor data for annotation. The heuristics can enable identifying whether annotating sensor data can potentially add value to a perception algorithm trained upon such annotated sensor data.

Figure 3:
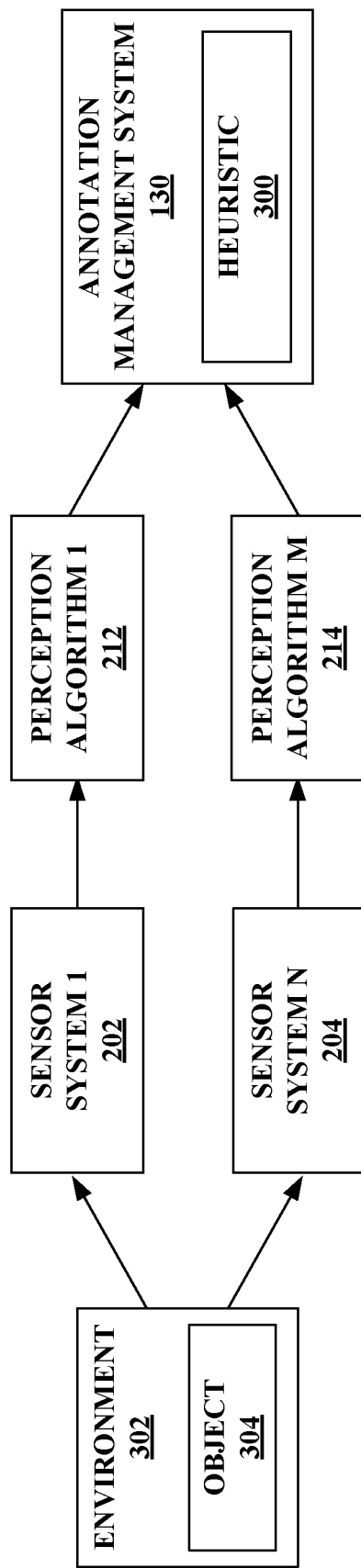
FIGS. 3-5 illustrate exemplary embodiments in which various heuristics are utilized by an annotation management system.

Turning to FIG. 3, illustrated is an exemplary embodiment in which a heuristic 300 is utilized by the annotation management system 130. As depicted in FIG. 3, the sensor system 1 202 can generate first sensor data representative of an environment 302 at a given time and the sensor system N 204 can generate second sensor data representative of the environment 302 at the given time. The first sensor data generated by the sensor system 1 202 can be inputted to the perception algorithm 1 212, and the second sensor data generated by the sensor system N 204 can be inputted to the perception algorithm M 214. While two sensor system-perception algorithm pairs are depicted in FIG. 3, it is contemplated that more than two sensor system-perception algorithm pairs can be used as part of the heuristic 300 (e.g., the heuristic 300 can identify when label(s) and/or confidence score(s) assigned by a perception algorithm for one sensor system modality differ from label(s) and/or confidence score(s) assigned by at least one other perception algorithm for a different sensor system modality).

The perception algorithm 1 212 can assign a first label to an object 304 at a particular location in the environment 302 based on the first sensor data generated for the given time by the sensor system 1 202. The first label identifies a first type of the object 304. The first label is assigned based on a first confidence score assigned to the first type of the object from amongst the predefined set of types by the perception algorithm 1 212. The perception algorithm 1 212 assigns the first confidence score to the first type of the object 304 based on the first sensor data corresponding to the particular location in the environment 302 for the given time generated by the sensor system 1 202. Moreover, the perception algorithm M 214 assigns a second label to the object 304 at the particular location in the environment 302 based on the second sensor data generated for the given time by the sensor system N 204. The second label identifies a second type of the object. It is to be appreciated that the first type and the second type can be the same or can differ. The second label is assigned based on a second confidence score assigned to the second type of the object 304 from amongst the predefined set of types by the perception algorithm M 214. The perception algorithm M 214 assigns the second confidence score to the second type of the object based on the second sensor data corresponding to the particular location in the environment 302 for the given time generated by the sensor system N 204. Moreover, the heuristic 300 implemented by the annotation management system 130 can include comparing labels and/or confidence scores generated by the differing perception algorithms based on sensor data from differing modalities of sensor systems.

Pursuant to an example, the heuristic 300 can include comparing the first label assigned to the object 304 at the particular location in the environment 302 by the perception algorithm 1 212 based on the first sensor data generated for the given time by the sensor system 1 202 and the second label assigned to the object 304 at the particular location in the environment 302 by the perception algorithm M 214 based on the second sensor data generated for the given time by the second sensor system N 204. Accordingly, the output of the heuristic 300 can indicate whether the first label and the second label differ. For instance, if the object 304 is assigned a label of a car by the perception algorithm 1 212 and is assigned a label of free space by the perception algorithm M 214, then the output of the heuristic 300 can indicate that the labels differ. When the labels differ as specified in the output of the heuristic 300, the annotation management system 130 can cause the sensor data for the given time (e.g., generated by the sensor system 1 202 and/or the second system N 204) to be annotated. Alternatively, if both the perception algorithm 1 212 and the perception algorithm M 214 indicate that the object 304 at a particular location in the environment 302 has the same type (e.g., the first label and the second label are the same), then the annotation management system 130 can inhibit the sensor data for the given time from being annotated.

According to another example, the heuristic 300 can compare confidence scores generated by the differing perception algorithms. Following this example, the heuristic 300 can include comparing the first confidence score assigned to the first type of the object 304 at the particular location in the environment 302 based on the first sensor data generated for the given time by the sensor system 1 202 and the second confidence score assigned to the second type of the object 304 at the particular location in the environment 302 based on the second sensor data generated for the given time by the sensor system N 204. The output of the heuristic 300 generated by the annotation management system 130 can indicate whether the first confidence score and the second confidence score differ by a threshold score difference. Thus, the heuristic 300 can be utilized to detect situations in which confidence scores differ significantly between the perception algorithms. The annotation management system 130 can cause the sensor data for the given time to be annotated when the output of the heuristic 300 specifies that the confidence scores differ by at least the threshold score difference, whereas the annotation management system 130 can inhibit the sensor data for the given time from being annotated when the output of the heuristic 300 specifies that the confidence scores differ by less than the threshold score difference. Following the foregoing example, it is contemplated that the first type of the object and the second type of the object can be the same. Thus, the same label can be assigned to the object 304 at the particular location in the environment 302. However, the sensor data can be potentially annotated when the confidence scores generated by the perception algorithms differ by at least the threshold score difference.

Figure 4:
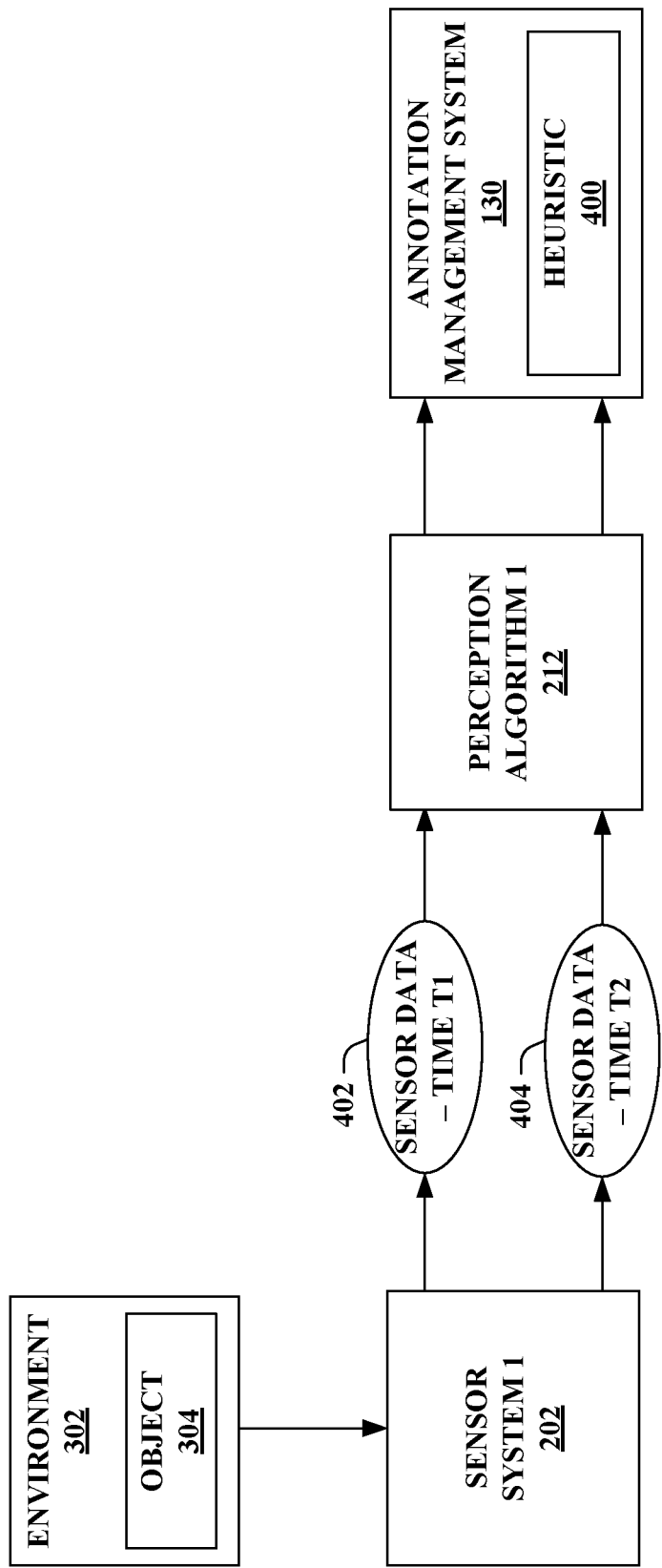

With reference to FIG. 4, illustrated is an exemplary embodiment in which a heuristic 400 is utilized by the annotation management system 130. As shown in FIG. 4, the sensor system 1 202 can generate sensor data representative of the environment 302 at various times, namely, time T1 and time T2 (e.g., first sensor data 402 at time T1 and second sensor data 404 at time T2). While sensor data generated at two times are shown in FIG. 4 and described in the examples below, it is contemplated that these examples can be extended to utilizing sensor data generated at X times, where X can be substantially any integer greater than one (e.g., sensor data generated at three or more times can be utilized).

Following the example set forth in FIG. 4, the perception algorithm 1 212 can assign a first label to an object 304 at a particular location in the environment 302 based on first sensor data 402 generated at time T1 by the sensor system 1 202. The first label can be assigned based on a first confidence score assigned to the type of the object 304 by the perception algorithm 1 212. The perception algorithm 1 212 can assign the first confidence score to the type of the object 304 based on the first sensor data 402 corresponding to the particular location in the environment 302 at the time T1. Moreover, the perception algorithm 1 212 can assign a second label to the object 304 at the particular location in the environment 302 based on the second sensor data 404 generated at time T2 by the sensor system 1 202. The second label can be assigned based on a second confidence score assigned to the type of the object 304 from amongst a predefined set of types by the perception algorithm 1 212. The perception algorithm 1 212 can assign the second confidence score to the type of the object 304 based on the second sensor data 404 corresponding to the particular location in the environment 302 at the time T2. The annotation management system 130 can utilize the heuristic 400 to determine whether to cause the first sensor data 402 for time T1 and/or the second sensor data 404 for time T2 to be annotated.

In accordance with an example, the heuristic 400 can include comparing the first label assigned to the object 304 at a particular location in the environment 302 based on the first sensor data 402 generated at the time T1 by the sensor system 1 202 and the second label assigned to the object 304 at the particular location in the environment 302 based on the second sensor data 404 generated at the time T2 by the sensor system 1 202. Following this example, the time T1 and the time T2 can be within a threshold time duration. Further, the output of the heuristic 406 can indicate whether the first label and the second label differ.

Pursuant to another example, the heuristic 400 can include comparing the first confidence score assigned to the type of the object 304 at the particular location in the environment 302 based on the first sensor data 402 generated at the time T1 by the sensor system 1 202 and the second confidence score assigned to the type of the object 304 at the particular location in the environment 302 based on second sensor data 404 generated at the time T2 by the sensor system 1 202. Again, the time T1 and the time T2 can be within a threshold time duration. The output of the heuristic 400 can indicate whether the first confidence score and the second confidence score differ by a threshold score difference.

Figure 5:
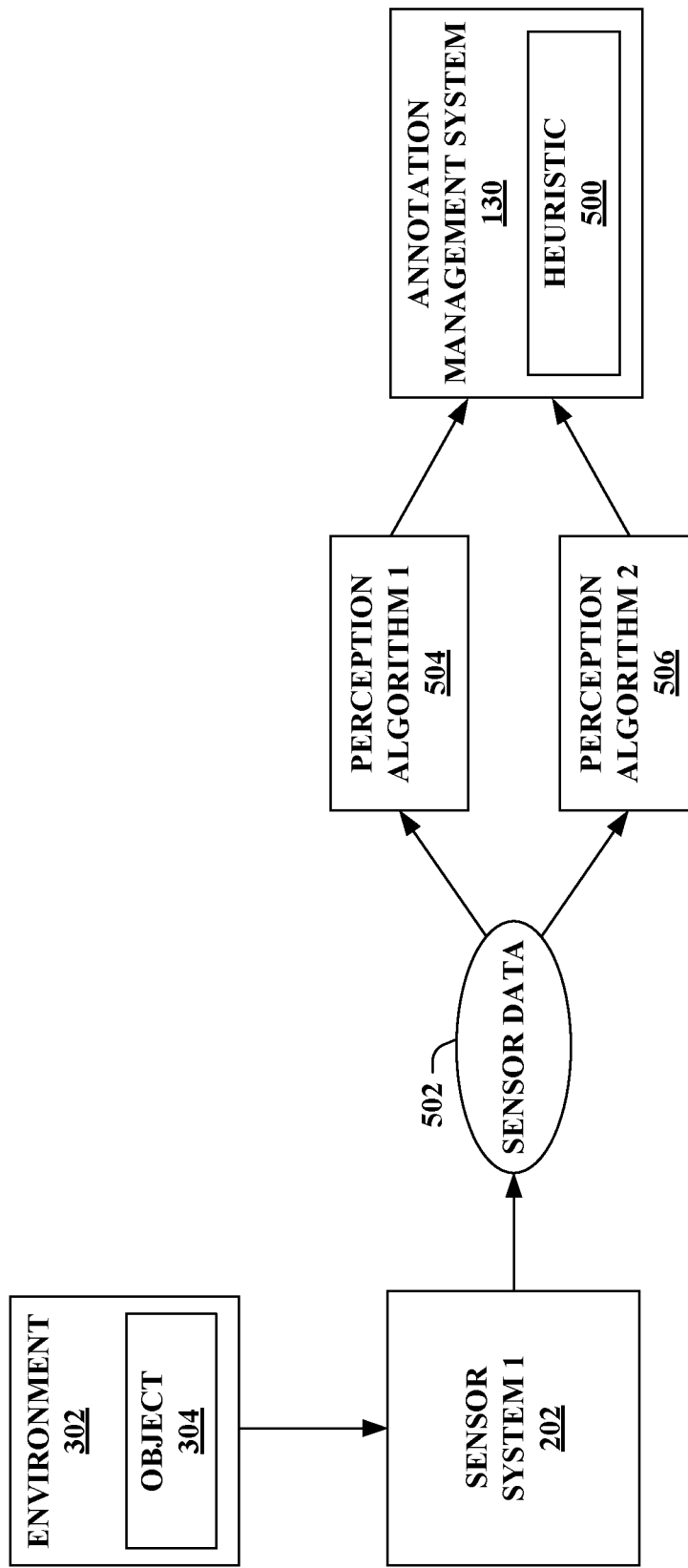

With reference to FIG. 5, illustrated is an embodiment in which a heuristic 500 is utilized by the annotation management system 130. As shown in FIG. 5, the sensor system 1 202 captures sensor data 502 representative of the environment 302. The sensor data 502 is inputted to two perception algorithms, namely, a perception algorithm 1 504 and a perception algorithm 2 506. According to an example, the perception algorithms 212-214 of FIG. 2 can include both the perception algorithm 1 504 and the perception algorithm 2 506. Pursuant to another example, the perception algorithms 212-204 of FIG. 2 can include the perception algorithm 1 504 while not including the perception algorithm 2 506. According to an illustration, the perception algorithm 2 506 can be utilized by a server computing system as described in greater detail herein; following this illustration, the sensor data 502 can be transmitted from the autonomous vehicle 102 to the server computing system to enable offline execution of the perception algorithm 2 506 (e.g., the perception algorithm 2 506 can be computationally heavier and more accurate than the perception algorithm 1 504 when run on the same data set). Further following this illustration, output of the perception algorithm 1 504 can also be transmitted from the autonomous vehicle 102 to the server computing system to enable the server computing system to utilize the heuristic 500. Moreover, while two perception algorithms are shown in FIG. 5 and described in the corresponding examples, it is contemplated that these examples can be extended to utilizing Y differing perception algorithms, where Y can be substantially any integer greater than one (e.g., three or more perception algorithms can be employed).

The perception algorithm 1 504 can assign a first label to an object 304 at a particular location in the environment 302 based on the sensor data 502 generated for a given time by the sensor system 1 202. The first label is assigned based on a first confidence score assigned to a type of the object 304 from amongst the predefined set of types by the perception algorithm 1 504. The perception algorithm 1 504 further assigns a first confidence score to the type of the object 304 based on the sensor data 502 corresponding to the particular location in the environment 302 for the given time. Moreover, the perception algorithm 2 506 assigns a second label to the object 304 at the particular location in the environment 302 based on the sensor data 502 generated for the given time by the sensor system 1 202. The second label is assigned based on a second confidence score assigned to the second type of the object 304 from amongst the predefined set of types by the perception algorithm 2 506. The perception algorithm 2 506 assigns a second confidence score to the second type of the object 304 based on the sensor data 502 corresponding to the particular location in the environment 302 for the given time.

According to an example, the heuristic 500 can compare the first label assigned to the object 304 at the particular location in the environment 302 by the perception algorithm 1 504 based on the sensor data 502 generated for the given time by the sensor system 1 202 and the second label assigned to the object 304 at the particular location in the environment 302 by the perception algorithm 2 506 based on the sensor data 502 generated for the given time by the sensor system 1 202. The output of the heuristic 506 can indicate whether the first label and the second label differ. When the first label and the second label differ, the annotation management system 130 can cause the sensor data 502 to potentially be annotated (while if the first label and the second label are the same, then the annotation management system 130 causes the sensor data 502 to not be annotated).

In accordance with another example, the heuristic 500 can include comparing the first confidence score assigned to the type of the object 304 at the particular location in the environment by the perception algorithm 1 504 based on the sensor data 502 generated for the given time by the sensor system 1 202 and the second confidence score assigned to the second type of the object 304 at the particular location in the environment 302 by the perception algorithm 2 506 based on the sensor data 502 generated for the given time by the sensor system 1 202. The output of the heuristic 500 can indicate whether the first confidence score in the second confidence score differ by a threshold score difference.

Figure 6:
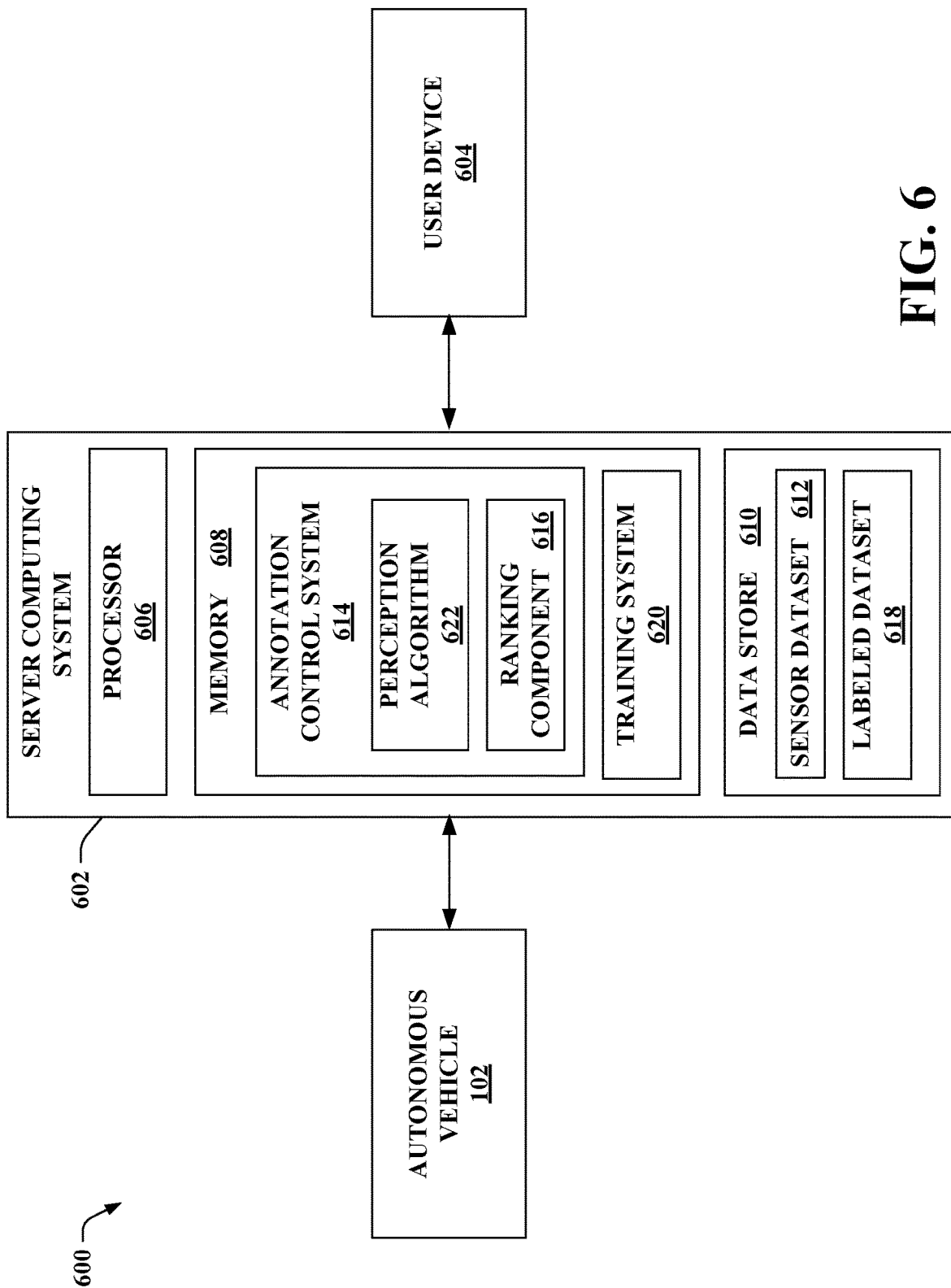
FIG. 6 illustrates an exemplary system that includes an autonomous vehicle, a server computing system, and a user device.

Turning to FIG. 6, illustrated is an exemplary system 600 that includes the autonomous vehicle 102, a server computing system 602, and a user device 604. The server computing system 602 can receive sensor data from the autonomous vehicle 102. Moreover, the server computing system 602 can selectively cause the sensor data to be transmitted to the user device 604 such that the user device 604 can be employed by a human labeler to annotate the sensor data.

The server computing system 602 includes at least one processor 606 that executes instructions that are stored in memory 608. Moreover, the server computing system 602 includes a data store 610. The data store 610 can include a sensor dataset 612. The sensor dataset 612 includes sensor data received from the autonomous vehicle 102 as well as other autonomous vehicles.

The memory 608 further includes an annotation control system 614 configured to transmit sensor data from the sensor dataset 612 to the user device 604 (as well as other user devices) for annotation. The annotation control system 614 can include a ranking component 616 that can rank the sensor data in the sensor dataset 612 to determine an order for annotating the sensor data in the sensor dataset 612. Thus, the annotation control system 614 can control the order in which the sensor data in the sensor dataset 612 is presented for annotation based on the ranking (e.g., to prioritize based on likely benefit for retraining a perception algorithm). For instance, the ranking component 616 can rank the sensor data based on confidence score differences (e.g., output of the heuristic that compares the confidence scores as described herein); however, other manners of ranking are intended to fall within the scope of the hereto appended claims (e.g., events where different labels are assigned can be ranked ahead of events where the same label is assigned but there are differences in confidence scores). The annotation control system 614 can further receive labeled data (e.g., the annotations) from the user device 604 (and the other user devices) and retain the labeled data as part of a labeled dataset 618 in the data store 610. Moreover, the memory 608 can include a training system 620 that can train a perception algorithm based on the labeled dataset 618.

According to various embodiments, the autonomous vehicle 102 can generate the output of the heuristic and control whether to cause sensor data to be annotated based on the output of the heuristic. Thus, the server computing system 602 can receive a subset of sensor data collected by the autonomous vehicle 102, where the subset to be provided from the autonomous vehicle 102 to the server computing system 602 is determined utilizing a heuristic (or heuristics).

In other embodiments, the annotation control system 614 can be substantially similar to the annotation management system 130 described herein. Thus, the annotation control system 614 can generate an output of a heuristic and control whether to cause sensor data to be annotated based on the output of the heuristic. Following this example, it is contemplated that the annotation control system 614 can include a perception algorithm 622 (or plurality of perception algorithms) that can be utilized by the server computing system 602 to assign labels and/or confidence scores.

By way of example, it is contemplated that the server computing system 602 can receive, from the autonomous vehicle 102, sensor data generated for a given time by a sensor system of the autonomous vehicle 102. The annotation control system 614 can assign a label to an object at a particular location in an environment based on the sensor data generated for the given time by the sensor system. Moreover, the label can be assigned based on a confidence score assigned to the type of the object from amongst a predefined set of types by the perception algorithm 622. The perception algorithm 622 can assign the confidence score to the type of the object based on the sensor data corresponding to the particular location in the environment for the given time. Moreover, the annotation control system 614 can generate an output of a heuristic based on the label and/or the confidence score assigned based on the sensor data for the given time. The annotation control system 614 can further control whether to cause the sensor data for the given time to be annotated based on the output of the heuristic. It is to be appreciated that the heuristics employed by the annotation control system 614 can be substantially similar to the heuristics employed by the annotation management system 130 (e.g., the annotation control system 614 can utilize the heuristic 300, the heuristic 400, the heuristic 500, or a combination thereof).

Moreover, according to another example, it is contemplated that the autonomous vehicle 102 can employ a first perception algorithm and the server computing system 602 can employ a second perception algorithm (e.g., the perception algorithm 622). As shown in the example of FIG. 5, the same sensor data can be inputted to both the first perception algorithm and the second perception algorithm. According to an illustration, the second perception algorithm employed by the server computing system 602 can be more computationally intensive and more accurate; however, the claimed subject matter is not so limited. Following this example, the autonomous vehicle 102 can transmit the sensor data as well as output of the first perception algorithm to the server computing system 602. The annotation control system 614 can generate an output of the heuristic based on the output of the first perception algorithm received from the autonomous vehicle 102 as well as output of the perception algorithm 622 run by the server computing system 602. The annotation control system 614 can further selectively control whether to send the sensor data to the user device 604 for annotation based on the output of the heuristic (e.g., as ranked by the ranking component 616).

Figure 7:
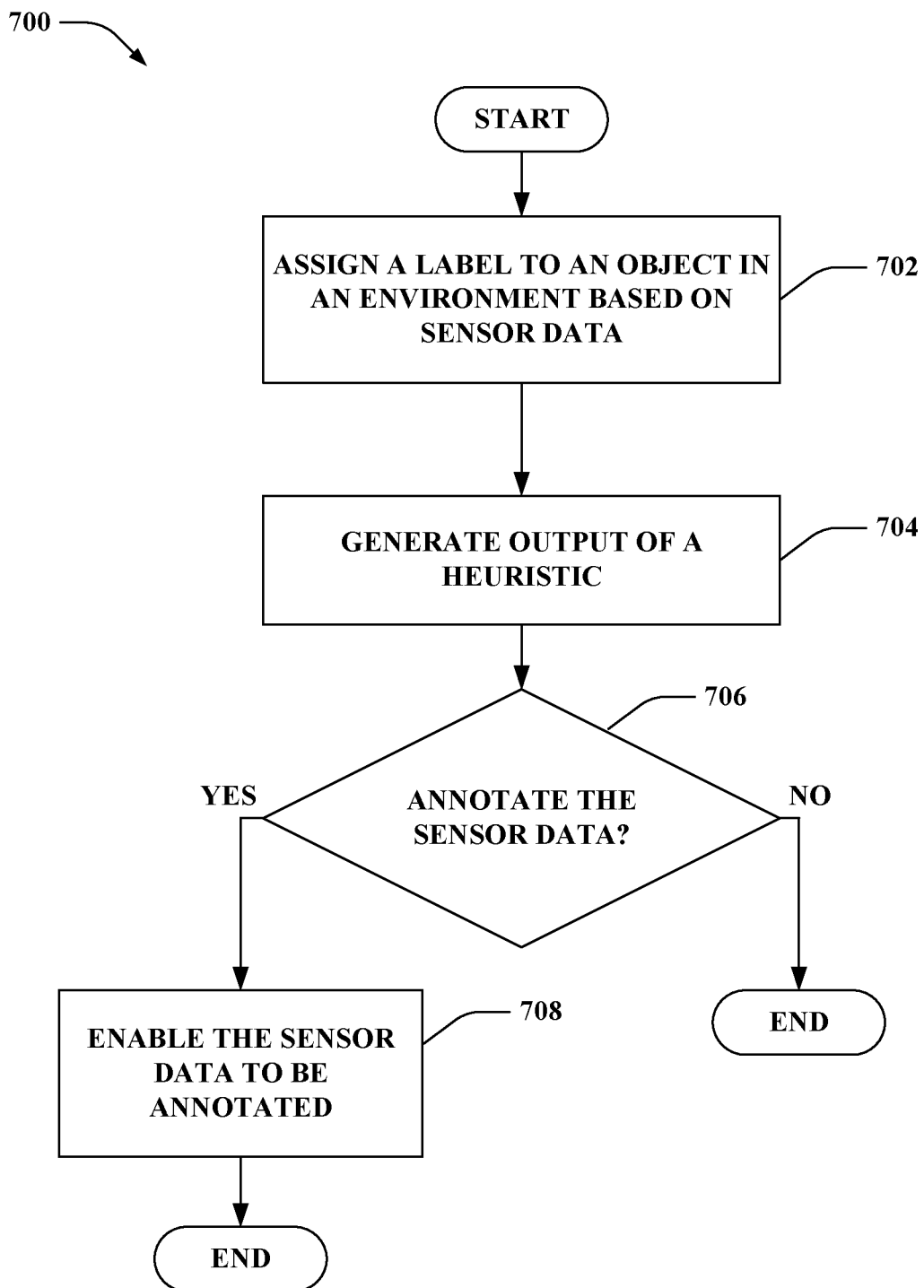
FIG. 7 is a flow diagram that illustrates an exemplary methodology of detecting data for autonomous vehicle perception training.

FIG. 7 illustrates an exemplary methodology relating to detecting data for annotation for autonomous vehicle perception training. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 7 illustrates a methodology 700 of detecting data for autonomous vehicle perception training. At 702, a label can be assigned to an object at a particular location in an environment based on sensor data generated for a given time by a sensor system of an autonomous vehicle. The label identifies a type of the object. Moreover, the label can be assigned based on a confidence score assigned to the type of the object from amongst a predefined set of types by a computer-implemented perception algorithm. Further, the computer-implemented perception algorithm assigns the confidence score to the type of the object based on the sensor data corresponding to the particular location in the environment for the given time. At 704, an output of a heuristic can be generated based on the label and/or the confidence score assigned based on the sensor data for the given time. At 706, a determination can be made whether to enable the sensor data to be annotated. The determination is based on the output of the heuristic. Thus, whether to cause the sensor data for the given time to be annotated can be controlled based on the output of the heuristic. If the sensor data is to be annotated as determined at 706, then the methodology 700 continues to 708. At 708, annotation of the sensor data can be enabled. For instance, the sensor data can be stored, flagged, and/or transmitted (e.g., from an autonomous vehicle to a server computing system) for annotation. Alternatively, if the sensor data is not to be annotated as determined at 706 based on the output of the heuristic, then the methodology 700 ends (e.g., and the sensor data is inhibited from being annotated).

Figure 8:
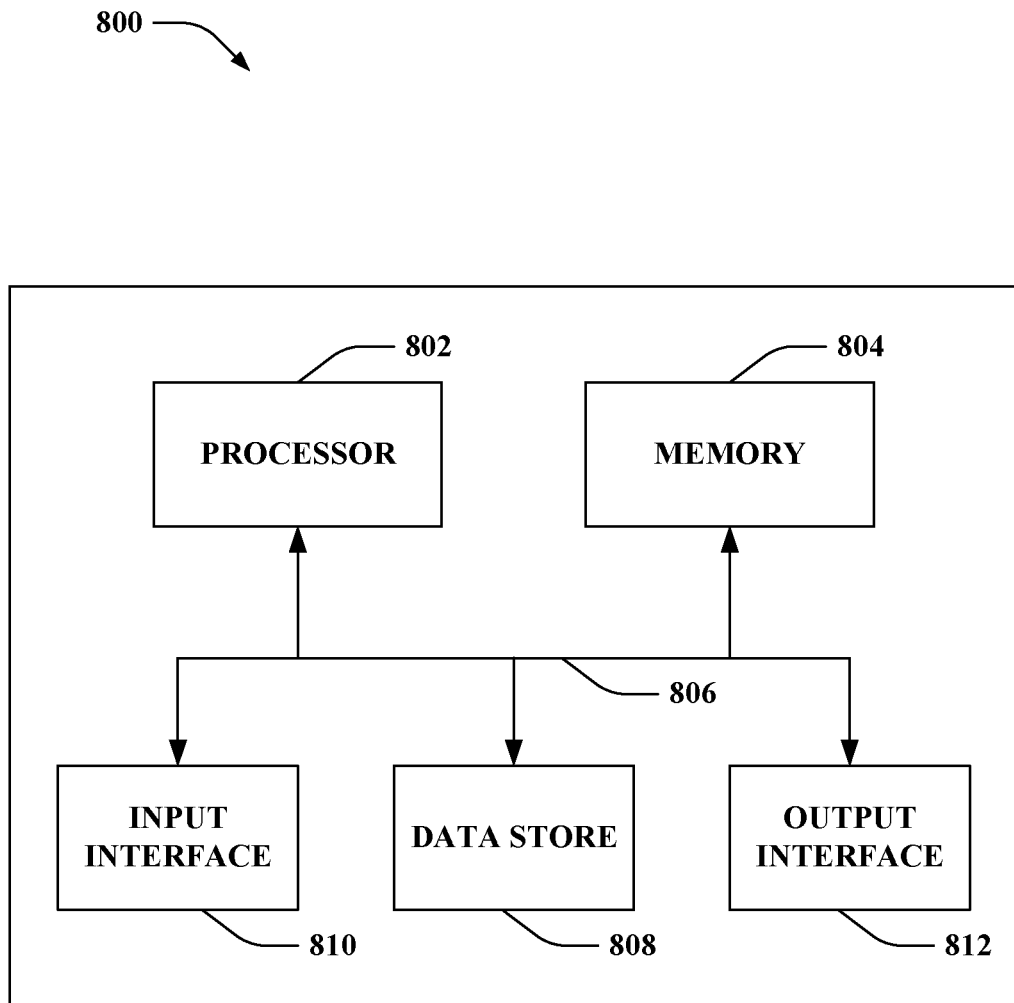
FIG. 8 illustrates an exemplary computing device.

Referring now to FIG. 8, a high-level illustration of an exemplary computing device 800 that can be used in accordance with the systems and methodologies disclosed herein is illustrated. For instance, the computing device 800 may be or include the computing system 122. According to another example, the server computing system 602 can be or include the computing device 800. The computing device 800 includes at least one processor 802 that executes instructions that are stored in a memory 804. The instructions may be, for instance, instructions for implementing functionality described as being carried out by one or more systems discussed above or instructions for implementing one or more of the methods described above. The processor 802 may be a GPU, a plurality of GPUs, a CPU, a plurality of CPUs, a multi-core processor, etc. The processor 802 may access the memory 804 by way of a system bus 806. In addition to storing executable instructions, the memory 804 may also sensor data, labeled data, and so forth.

The computing device 800 additionally includes a data store 808 that is accessible by the processor 802 by way of the system bus 806. The data store 808 may include executable instructions, sensor data, labeled data, etc. The computing device 800 also includes an input interface 810 that allows external devices to communicate with the computing device 800. For instance, the input interface 810 may be used to receive instructions from an external computer device, etc. The computing device 800 also includes an output interface 812 that interfaces the computing device 800 with one or more external devices. For example, the computing device 800 may transmit control signals to the vehicle propulsion system 206, the braking system 208, and/or the steering system 210 by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A server computing system, comprising:
  a processor; and
  memory that stores computer-executable instructions that, when executed by the processor, cause the processor to perform acts comprising:
    receiving, from an autonomous vehicle, sensor data generated for a given time by at least one sensor system of the autonomous vehicle;
    assigning a first label to an object at a particular location in an environment based on the sensor data generated for the given time by the at least one sensor system, wherein the first label identifies a first type of the object, wherein the first label is assigned based on a first confidence score assigned to the first type of the object from amongst a predefined set of types by a first computer-implemented perception algorithm, and wherein the first computer-implemented perception algorithm assigns the first confidence score to the first type of the object based on the sensor data corresponding to the particular location in the environment for the given time;
generating an output of a heuristic based on at least one of:
   a comparison of the first label and a second label assigned based on the sensor data for the given time; or
   a comparison of the firsts confidence score and a second confidence score assigned based on the sensor data for the given time; and
selectively transmitting the sensor data to a user device for annotation based on the output of the heuristic,
wherein the second label is assigned to the object at the particular location in the environment based on the sensor data generated for the given time by the at least one sensor system, wherein the second label identifies a second type of the object, wherein the second label is assigned based on the second confidence score assigned to the second type of the object from amongst the predefined set of types by a second computer-implemented perception algorithm, wherein the second computer-implemented perception algorithm assigns the second confidence score to the second type of the object based on the sensor data corresponding to the particular location in the environment for the given time, and wherein the first computer-implemented perception algorithm differs from the second computer-implemented perception algorithm.

2. The server computing system of claim 1, wherein the memory further stores computer-executable instructions that, when executed by the processor, cause the processor to perform acts comprising:
   ranking the sensor data for the given time relative to disparate sensor data in an order for annotation, wherein the sensor data is further selectively transmitted to the user device for annotation based on the order for annotation.

3. The server computing system of claim 1, wherein the memory further stores computer-executable instructions that, when executed by the processor, cause the processor to perform acts comprising:
   receiving labeled data comprising annotations of the sensor data from the user device responsive to transmitting the sensor data for annotation; and
   training an updated computer-implemented perception algorithm based at least in part on the labeled data.

4. The server computing system of claim 1, wherein the memory further stores computer-executable instructions that, when executed by the processor, cause the processor to perform acts comprising:
   receiving, from the autonomous vehicle, at least one of the second label or the second confidence score, wherein the autonomous vehicle employs the second computer-implemented perception algorithm to assign the second label and the second confidence score.

5. The server computing system of claim 1, wherein the memory further stores computer-executable instructions that, when executed by the processor, cause the processor to perform acts comprising:
   assigning the second label to the object at the particular location in the environment based on the sensor data generated for the given time by the at least one sensor system, wherein the server computing system employs the second computer-implemented perception algorithm to assign the second label and the second confidence score.

6. The server computing system of claim 1, wherein the memory further stores computer-executable instructions that, when executed by the processor, cause the processor to perform acts comprising:
   receiving, from the autonomous vehicle, differing sensor data generated for a differing time by the at least one sensor system of the autonomous vehicle;
   wherein the output of the heuristic is further generated based on the comparison of the first label assigned to the object at the particular location in the environment based on the sensor data generated for the given time by the at least one sensor system and a third label assigned to the object at the particular location in the environment based on the differing sensor data generated for the differing time by the at least one sensor system, wherein the given time and the differing time are within a threshold time duration, wherein the output of the heuristic indicates whether the first label and the third label differ, and wherein the sensor data is transmitted to the user device for annotation if the first label and the third label differ.

7. The server computing system of claim 1, wherein the memory further stores computer-executable instructions that, when executed by the processor, cause the processor to perform acts comprising:
   receiving, from the autonomous vehicle, differing sensor data generated for a differing time by the at least one sensor system of the autonomous vehicle;
   wherein the output of the heuristic is further generated based on a comparison of the first confidence score assigned to the first type of the object at the particular location in the environment based on the sensor data generated for the given time by the at least one sensor system and a third confidence score assigned to a third type of the object at the particular location in the environment based on the differing sensor data generated for the differing time by the at least one sensor system, wherein the given time and the differing time are within a threshold time duration, wherein the output of the heuristic indicates whether the first confidence score and the third confidence score differ by a threshold score difference, and wherein the sensor data is transmitted to the user device for annotation if the first confidence score and the third confidence score differ by at least the threshold score difference.

8. The server computing system of claim 1, wherein;
   the sensor data generated for the given time by the at least one sensor system and received from the autonomous vehicle comprises first sensor system data generated for the given time by a first sensor system of the autonomous vehicle and second sensor system data generated for the given time by a second sensor system of the autonomous vehicle, wherein the first sensor system differs from the second sensor system;
   the first label is assigned to the object at the particular location in the environment based on the first sensor system data generated for the given time by the first sensor system, and the first computer-implemented perception algorithm assigns the first confidence score to the first type of the object based on the first sensor system data corresponding to the particular location in the environment for the given time generated by the first sensor system; and the second label is assigned to the object at the particular location in the environment based on the second sensor system data generated for the given time by the second sensor system, and the second computer-implemented perception algorithm assigns the second confidence score to the second type of the object based on the second sensor system data corresponding to the particular location in the environment for the given time.

9. The server computing system of claim 8, wherein the first type of the object and the second type of the object are the same.

10. The server computing system of claim 8, wherein:
the first sensor system is one of a lidar sensor system, a camera sensor system, or a radar sensor system; and
the second sensor system is a differing one of the lidar sensor system, the camera sensor system, or the radar sensor system.

11. The server computing system of claim 1, wherein the first computer-implemented perception algorithm is a first neural network and the second computer-implemented perception algorithm is a second neural network.

12. The server computing system of claim 1, wherein the memory further stores computer-executable instructions that, when executed by the processor, cause the processor to perform acts comprising:
based on the output of the heuristic, one of:
storing the sensor data for the given time such that the sensor data for the given time is stored for annotation, wherein the annotation of the sensor data for the given time is desirably used to retrain at least one of the first computer-implemented perception algorithm or the second computer-implemented perception algorithm; or
discarding the sensor data for the given time.

13. A method of detecting data for annotation for autonomous vehicle perception training, comprising:
receiving, from an autonomous vehicle, sensor data generated for a given time by at least one sensor system of the autonomous vehicle;
assigning a first label to an object at a particular location in an environment based on the sensor data generated for the given time by the at least one sensor system, wherein the first label identifies a first type of the object, wherein the first label is assigned based on a first confidence score assigned to the first type of the object from amongst a predefined set of types by a first computer-implemented perception algorithm, and wherein the first computer-implemented perception algorithm assigns the first confidence score to the first type of the object based on the sensor data corresponding to the particular location in the environment for the given time;
generating an output of a heuristic based on at least one of:
a comparison of the first label and a second label assigned based on the sensor data for the given time; or
a comparison of the first confidence score and a second confidence score assigned based on the sensor data for the given time; and
selectively transmitting the sensor data to a user device for annotation based on the output of the heuristic;
wherein the second label is assigned to the object at the particular location in the environment based on the sensor data generated for the given time by the at least one sensor system, wherein the second label identifies a second type of the object, wherein the second label is assigned based on the second confidence score assigned to the second type of the object from amongst the predefined set of types by a second computer-implemented perception algorithm, wherein the second computer-implemented perception algorithm assigns the second confidence score to the second type of the object based on the sensor data corresponding to the particular location in the environment for the given time, and wherein the first computer-implemented perception algorism differs from the second computer-implemented perception algorithm.

14. The method of claim 13, further comprising:
assigning the second label to the object at the particular location in the environment based on the sensor data generated for the given time by the at least one sensor system, wherein a server computing system employs the second computer-implemented perception algorithm to assign the second label and the second confidence score.

15. The method of claim 13, wherein
the sensor data generated for the given time by the at least one sensor system and received from the autonomous vehicle comprises first sensor system data generated for the given time by a first sensor system of the autonomous vehicle and second sensor system data generated for the given time by a second sensor system of the autonomous vehicle, wherein the first sensor system differs from the second sensor system;
the first label is assigned to the object at the particular location in the environmental based on the first sensor system data generated for the given time by the first sensor system, and the first computer-implemented perception algorithm assigns the first confidence score to the first type of the object based on the first sensor system data corresponding to the particular location in the environment for the given time generated by the first sensor system; and
the second label is assigned to the object at the particular location in the environment based on the second sensor system data generated for the given time by the second sensor system of the autonomous vehicle, and the second computer-implemented perception algorithm assigns the second confidence score to the second type of the object based on the second sensor system data corresponding to the particular location in the environment for the given time.

16. The method of claim 13, further comprising:
receiving, from the autonomous vehicle, second sensor data generated for a differing time by the at least one sensor system of the autonomous vehicle, wherein the given time and the differing time are within a threshold time duration;
assigning a third label to the object at the particular location in the environment based on the second sensor data generated for the differing time by the at least one sensor system of the autonomous vehicle, wherein the third label identifies a third type of the object, wherein the third label is assigned based on a third confidence score assigned to the third type of the object from amongst the predefined set of types by the first computer-implemented perception algorithm, and wherein the first computer-implemented perception algorithm assigns the third confidence score to the third type of the object based on the second sensor data corresponding to the particular location in the environment for the differing time; and wherein the output of the heuristic is further generated based on at least one of:
- a comparison of the first label and the third label; or
- a comparison of the first confidence score and the third confidence score.

17. The method of claim 13, further comprising:
ranking the sensor data for the given time relative to disparate sensor data in an order for annotation, wherein the sensor data is further selectively transmitted to the user device for annotation based on the order for annotation.

18. The method of claim 13, further comprising:
receiving labeled data comprising annotations of the sensor data from the user device responsive to transmitting the sensor data for annotation; and
training an updated computer-implemented perception algorithm based at least in part on the labeled data.

19. The method of claim 13, further comprising:
receiving, from the autonomous vehicle, at least one of the second label or the second confidence score, wherein the autonomous vehicle employs the second computer-implemented perception algorithm to assign the second label and the second confidence score.

20. A server computing system, comprising:
a processor; and
memory that stores computer-executable instructions that, when executed by the processor, cause the processor to perform acts comprising:
- receiving, from an autonomous vehicle, sensor data generated for a given time by at least one sensor system of the autonomous vehicle;
- assigning a first label to an object at a particular location in an environment based on the sensor data generated for a given time by the at least one sensor system, wherein the first label identifies a first type of the object, wherein the first label is assigned based on a first confidence score assigned to the first type of the object from amongst a predefined set of types by a first computer-implemented perception algorithm, and wherein the first computer-implemented perception algorithm assigns the first confidence score to the first type of the object based on the sensor data corresponding to the particular location in the environment for the given time;
- assigning a second label to the object at the particular location in the environment based on the sensor data generated for the given time by the at least one sensor system, wherein the second label identifies a second type of the object, wherein the second label is assigned based on a second confidence score assigned to the second type of the object from amongst the predefined set of types by a second computer-implemented perception algorithm, wherein the second computer-implemented perception algorithm assigns the second confidence score to the second type of the object based on the sensor data corresponding to the particular location in the environment for the given time, and wherein the first computer-implemented perception algorithm differs from the second computer-implemented perception algorithm;
- generating an output of a heuristic based on at least one of:
  - a comparison of the first label and the second label assigned based on the sensor data for the given time; or
  - a comparison of the first confidence score and the second confidence score assigned based on the sensor data for the given time; and
- based on the output of the heuristic, one of:
  - storing the sensor data for the given time such that the sensor data for the given time is stored for annotation, wherein the annotation of the sensor data for the given time is desirably used to retrain at least one of the first computer-implemented perception algorithm or the second computer-implemented perception algorithm; or
  - discarding the sensor data for the given time.

* * * * *